United States Patent
Jezierski et al.

(10) Patent No.: US 7,928,842 B2
(45) Date of Patent: *Apr. 19, 2011

(54) APPARATUS AND METHOD FOR REMOTE VIEWING SYSTEM

(76) Inventors: Scott Jezierski, Lino Lakes, MN (US); Andrew W Knight, Fridley, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 12/584,403

(22) Filed: Sep. 5, 2009

(65) Prior Publication Data

US 2010/0045795 A1 Feb. 25, 2010

Related U.S. Application Data

(63) Continuation of application No. 11/440,673, filed on May 25, 2006, now Pat. No. 7,609,952.

(60) Provisional application No. 60/704,385, filed on Aug. 1, 2005.

(51) Int. Cl.
*G08B 21/00* (2006.01)
(52) U.S. Cl. .......... 340/540; 340/569; 396/56; 348/152; 348/E5.042
(58) Field of Classification Search .................. 340/540, 340/569, 570, 568.1; 232/17, 34; 396/56; 348/152, E5.042
See application file for complete search history.

(56) References Cited

U.S. PATENT DOCUMENTS

| | | | | |
|---|---|---|---|---|
| 6,114,959 A | * | 9/2000 | Bennett | 340/569 |
| 6,307,472 B1 | * | 10/2001 | Robertson | 340/569 |
| 6,715,669 B2 | * | 4/2004 | Hara | 232/45 |
| 6,879,255 B1 | * | 4/2005 | Jezierski | 340/540 |
| 7,609,952 B2 | * | 10/2009 | Jezierski et al. | 396/56 |
| 2002/0024438 A1 | * | 2/2002 | Roberson | 340/569 |

* cited by examiner

*Primary Examiner* — John A Tweel, Jr.
(74) *Attorney, Agent, or Firm* — Mark Manley

(57) ABSTRACT

An energy conserving remote viewing system comprising an instantaneous analog video transmission camera, an analog video receiver that receives and transmits a video image to a video monitor and a remote transmitter that activates the analog video transmission camera. The remote camera device is normally in a low power, sleep mode that has a minimal power drain. The system includes a battery powered camera requiring a first voltage to operate and an RF transmitter to send an activation signal to the camera. The activation signal has a duration. A camera power circuit includes a normally sleeping signal receiving circuit and a first timer. The first timer periodically activates the signal receiving circuit to check for the presence of the activation signal and turns off the signal receiving circuit if the activation signal is not present and turns on the camera if the activation signal is present, and wherein the time the signal receiving circuit sleeps is less than the activation signal duration.

20 Claims, 4 Drawing Sheets

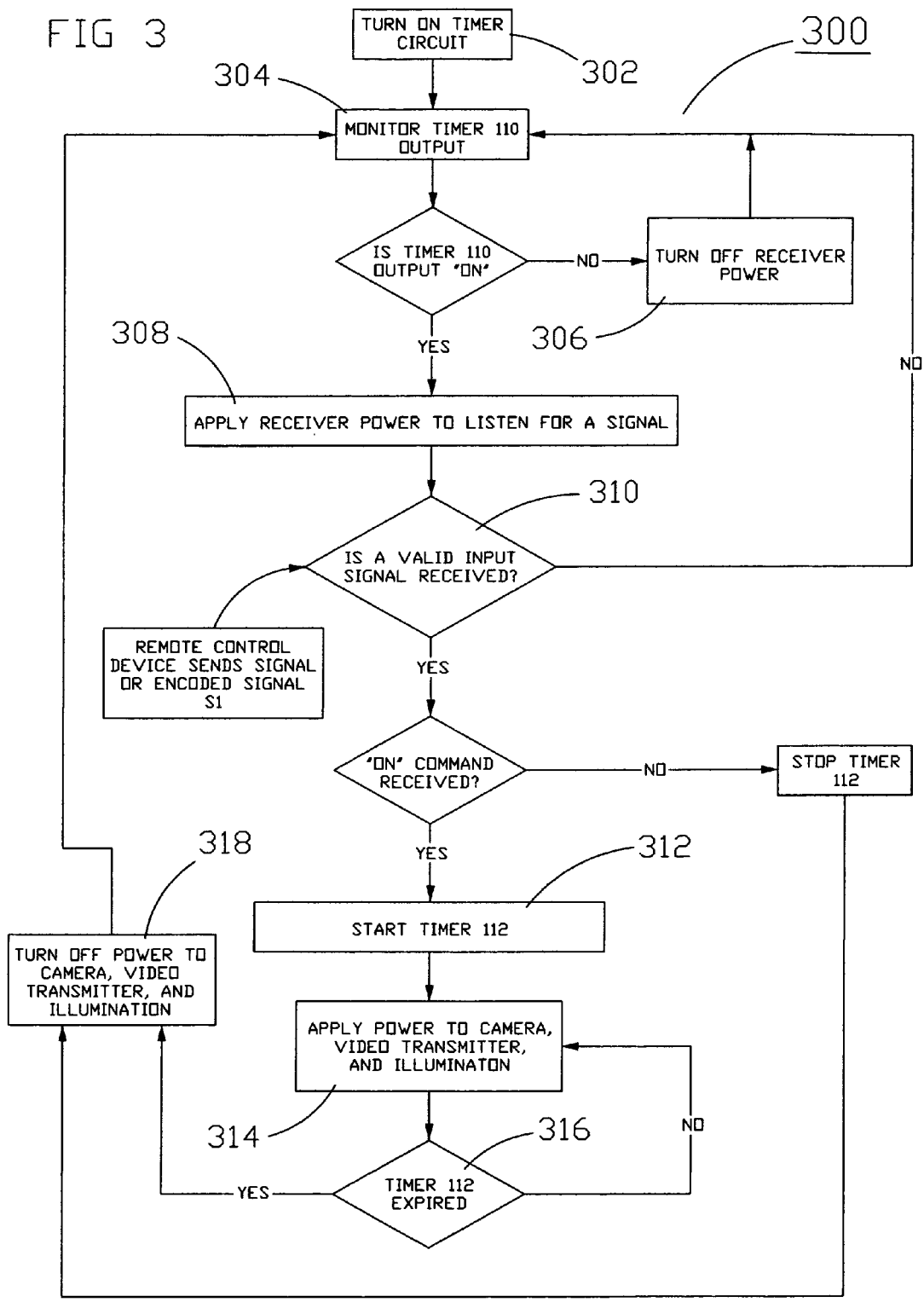

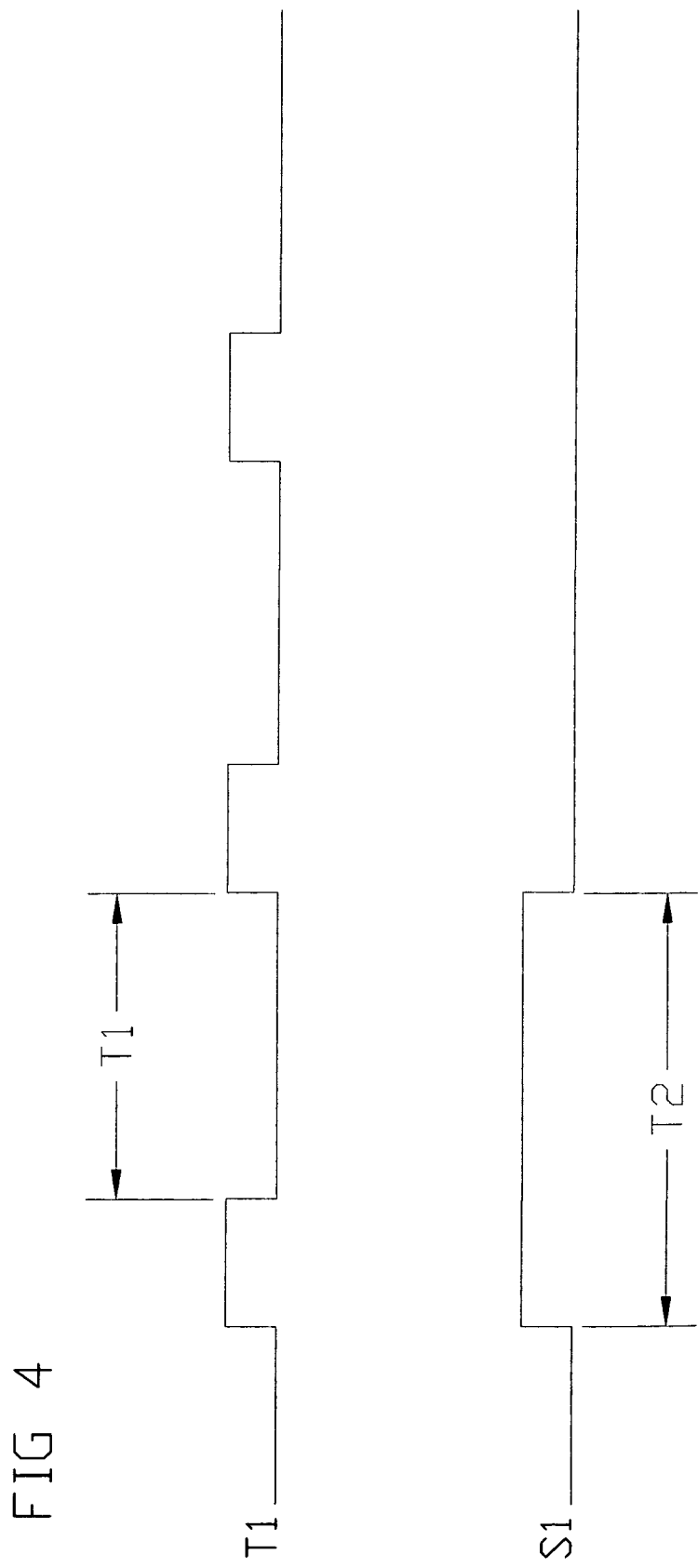

APPARATUS AND METHOD FOR REMOTE VIEWING SYSTEM

CROSS-REFERENCE TO RELATED APPLICATION

Applicant claims priority under 35 USC 119 to provisional patent application 60/704,385 filed Aug. 1, 2005. This is a continuation of application Ser. No. 11/440,673 now U.S. Pat. No. 7,609,952, filed May 25, 2006.

BACKGROUND

1. Field of the Invention

This invention relates to an energy conserving video monitoring system for monitoring a remote location at a distance. In particular this invention relates to an apparatus and method to view a remote location with a battery powered camera that uses a minimum of energy.

2. Description of the Prior Art

Often times there is a need to remotely monitor a location. For example there may be a need to monitor an elderly person or a young child. It may be desirable to remotely monitor for the presence of mail in a mail box as in applicant's own U.S. Pat. No. 6,879,255. Or it may be desirable to remotely monitor equipment, wildlife or for security for example. In many of these applications there may not be power readily available and a remote camera may need to operate on batteries. In these situations a common problem is that the camera battery can run out of power fairly quickly forcing the user to travel to the remote location to replace a battery. Solar power can be used but can be expensive and unreliable in many locations.

Applicant's prior U.S. Pat. No. 6,879,255 provides a system for remotely monitoring for mail in a mailbox. The system provides a battery 16 for a remote camera 18 in the mailbox. The system provides a sleep mode, where the camera 18 and lights are not on all the time, only when needed to conserve battery power. But it has been found that the system still draws significant power in sleep mode, waiting for a signal from transmitter 38 to turn the camera on.

As can be seen, there is a need for a remote monitoring system that will use less power and thus require less effort to operate.

SUMMARY OF THE INVENTION

The present invention is an instantaneous remote viewing system comprising; a battery powered camera requiring a first voltage to operate and an RF transmitter to send an activation signal to the camera. The activation signal has a duration. A camera power circuit includes a normally sleeping signal receiving circuit and a first timer wherein the first timer periodically activates the signal receiving circuit to check for the presence of the activation signal. The timer turns off the signal receiving circuit if the activation signal is not present and turns on the camera if the activation signal is present and wherein the time the signal receiving circuit sleeps is less than the activation signal duration. Such that the remote viewing system can conserve battery power by keeping the receiving circuit off except for during periods that are slightly shorter than the duration of an activation signal such that an activation signal will not be missed.

Further the present invention includes a voltage booster circuit to maximize the usable power from a battery. The booster will boost battery voltage up to at least a minimum required by the camera.

BRIEF DESCRIPTION OF THE DRAWINGS

In the drawings, closely related items have the same number but different alphabetic suffixes.

FIG. 3 shows a flow chart for the operation of the device.
FIG. 4 shows a comparison of the activation signal to the timer period

DESCRIPTION—FIG. 1

Figure 1:
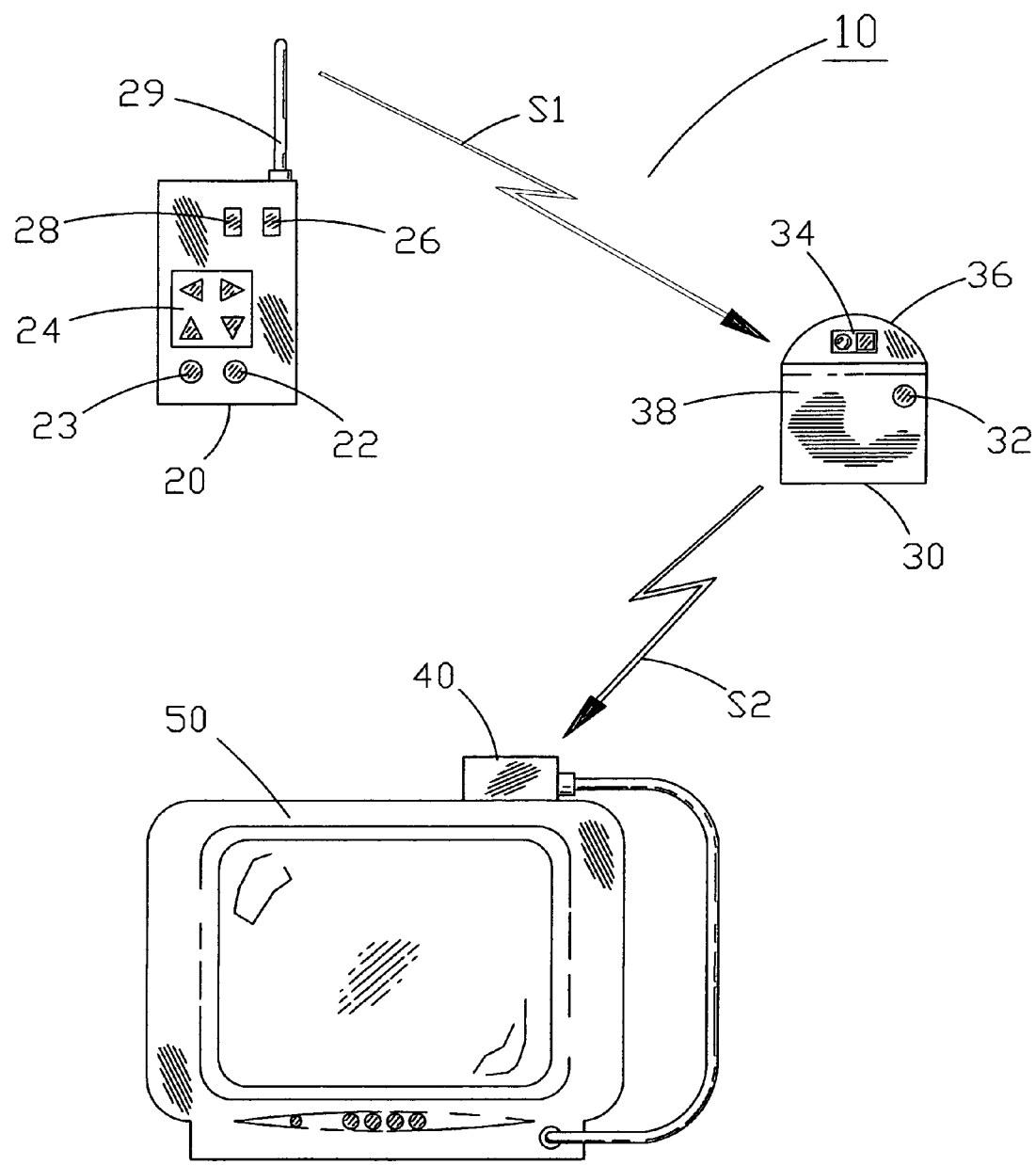
FIG. 1 shows the apparatus of the preferred system.

FIG. 1 shows the remote viewing camera system 10. The remote viewing camera system 10 can include a control transmitter 20, a remote camera system 30, a receiver 40 and a monitor 50. The control transmitter 20 can include a button 22 used to activate the remote camera system 30, to wake it up from a sleep mode. The control transmitter 20 can also include buttons 24 to remotely control the position of the camera 34, button 26 to control sound transmitted from remote camera system 30 and button 28 to control a light 32 associated with the remote camera system 30. The control transmitter 20 can include an antenna 29 to send an encoded control signal S1 to remote camera system 30.

The remote camera system 30 can include a light 32 and a camera 34. The camera can include a dome housing 36 and the camera will include camera control circuit 38. The remote camera system can send a signal S2 to a receiver 40 that can receive the signal S2 and convert it to a format that can be displayed on a monitor 50 that might be a computer or home TV.

Figure 2:
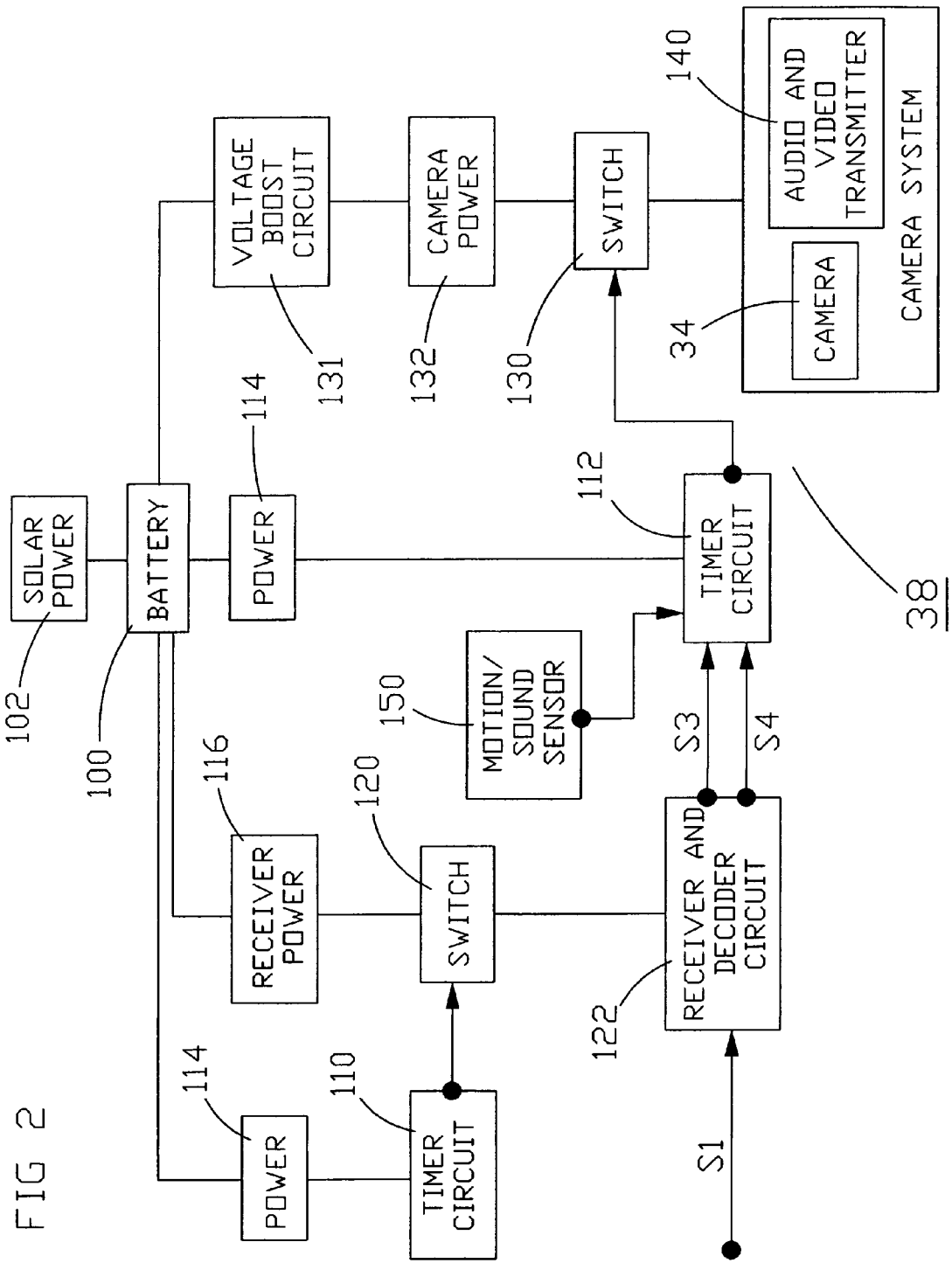
FIG. 2 shows a block diagram of the circuit of the device.

Description—FIG. 2

The camera control circuit 38 receives a signal S1 from control transmitter 20. The camera circuit control 38 can include a battery 100 that provides the main power source. The battery 100 can be a rechargeable battery that has a solar powered charger 102. Power from the battery 100 can be applied to two timer circuits 110 and 112. The timer circuit 110 runs constantly but uses very little power. The timer circuit 110 counts a preset amount of time, typically in the range of a few seconds and then activates switch 120 to activate the receiver decoder circuit 122. The receiver decoder circuit 122 still uses very little power but more than the timer circuit 110. When activated the receiver decoder circuit checks for the presence of activation signal S1. If the activation signal S1 is present then the receiver decoder circuit 122 sends a trigger signal S3 that activates the second timer 112 that in turn closes switch 130 to apply camera power 132 to remote camera system 30 which includes camera 34 and video transmitter circuit 140. Power 114 applied to the timer circuits 110, 112 can be very low, power 116 to receiver decoder circuit 122 may be higher and power 132 to the remote camera will be the highest with the camera 34 requiring voltage in the 8 volt range for example. When the signal S1 is no longer present and when a set time has passed with camera 34 on, the timer 112 can send a signal S4 to turn camera 34 off. Thus the camera circuit 38 has a dual sleep mode where the camera 34 and nearly all circuitry in circuit 38 except timer 110 sleeps until a signal S1 is received.

The circuit 38 can include an alternate sensor 150 that might close switch 120 based on receiving a local signal such as movement or sound in the remotely monitored location. Thus movement of an animal, or an elderly parent calling for help could close switch 120 and power up receiver decoder 122. Alternately, for some applications, the motion detector 150 would apply a signal to the receiver decoder 122 that could only be detected when the timer 110 has the receiver detector 122 awake.

The camera power 132 comes from a step up voltage booster 131. The voltage booster 131 can boost the voltage of a battery up to meet a minimum threshold required by the camera 34. For example, if the battery 100 is going dead and its voltage has dropped below the minimum, the voltage booster will increase the battery voltage so that more power can be drained from the battery 100 to extend the camera 34 operating time. So if for example, the battery 100 was a 9 volt battery to power a camera that needed roughly 8 volts, experience has shown that when the batteries dropped to 7 volts the camera 34 would stop working wasting the remaining power.

The battery 100 currently used is three 1.5 volt AA batteries that are hooked in series to give 4.5 volts. The receiver 122 and timers 110 and 112 can operate directly on battery voltage. The camera 34 runs on approximately 8 volts, so to operate on the three AA battery 100 the voltage must be boosted.

In the preferred embodiment, battery power 100 is wired in parallel with solar cell 102. Battery 100 is preferred to be 3 rechargeable AA batteries but other voltages and types of batteries may be used. The preferred analog video camera 34 is miniature, a low power, black and white, CMOS unit as is known in the art. Color CMOS units may also be used. The preferred analog video camera 34 operates on a standard transmission frequency of approximately 2.4 GHz, with a voltage range of 6 to 12 volts at a power output of 50 to 200 mw. The preferred analog video camera 34 can operate at a minimum illumination of 3 LUX.

Analog video camera 34 can be wired in series with the light source 32. Light source 32 can be an LED light in the preferred embodiment but can also be made form halogen, incandescent or other types of light sources. The light 32 may not be required for some applications.

Description—FIG. 3

FIG. 3 shows the flow chart 300 for checking for activation signal S1 and for turning the circuit 122 and camera system 30 on and off. The timer circuit 110 is turned on 302 and monitored 304 by switch 120. So long as the timer 110 is off no power 306 is applied to receiver decoder circuit 122. When the timer circuit 110 reaches a preset time, then power is applied to receiver decoder circuit 122 to listen 308 for signal S1.

If the signal S1 is present 310, then the timer 112 is started 312 and power is applied 314 to the camera system 30 for the amount of time preset in timer 112. When the timer 112 expires 316, power is turned off 318 from remote camera system 30.

Description—FIG. 4

FIG. 4 shows a timeline comparing the duration of the timer 110 to the duration of the activation signal S1. The top line T1 shows that the timer 110 periodically activates the receiver circuit 122. The period when the receiver decoder circuit 122 is turned off is T1. The lower line shows an activation signal S1 that occurs at some time. The duration of the activation signal is T2 which is longed that the period T1 such that the activation signal S1 will be received no matter when it is sent because it will overlap at least one waking period for the receiving decoder circuit 122. This conserves battery power at the remote site. The period T2 may be longer than the user holds button 22, the period T2 can be created by mechanical or electronic means from a instant push of the button 22.

Operation of Preferred Embodiment

The remote viewing system is normally in sleep mode. Remote RF receiver/decoder 38 in FIG. 2 is normally in standby/low power consumption mode waiting for a RF activation signal S1 to activate the camera 34. The user can turn the power on for monitor 50 and receiver for analog transmission 40 or in some cases these may be left on at all times and may be capable of recording a video transmission. The user activates power button 22 on transmitter 20. Transmitter 20 then sends a radio frequency signal S1 to instantaneous remote camera system 30 as shown in FIG. 1. Instantaneous remote camera system 30 goes from low power-sleep mode to transmit power-on mode and transmits an instantaneous analog image to RF receiver 40 as shown in FIG. 1. RF receiver 40 sends the visual and sound signal to television or other monitor 50 for viewing by the user. When the user releases power button 22, the RF transmission stops when timer 112 times out and remote camera system 30 goes from transmit power-on mode to low power, sleep mode and the image stops. Thus a user could push and release button 22 to receive a brief view the length of which would be set by the time set for timer 112. This would give the user a brief energy conserving look, the user could extend the video transmission S2 by holding the button 22 down.

FIG. 2 shows the details of the components of the remote camera circuit 38. Remote camera circuit 38 is normally in low power consumption-sleep mode and the only component activated is timer 110. When timer 110 activates receiver decoder circuit 122 it checks for a signal S1 for a length of time set on timer 110 which could be less than one second and then allows the receiver circuit 122 to sleep for a duration of time that can be seconds or minutes to save battery power. For example, the transmitter 20 can be set to send an activation signal S1 that lasts for 30 seconds. The timer 110 can activate the receiver decoder once every 25 seconds, that is to say the duration of the sleep cycle is less than the duration of one activation signal. This creates an overlap where at least a portion of any 30 second activation signal S1 must fall within one or more of the times when the receiver decoder circuit 122 is on to receive it.

Although the description above contains many specific details, these should not be construed as limiting the scope of the invention but as merely providing illustrations of some of the presently preferred embodiments of the invention. Many different battery power sources can be used such as alkaline, nickel cadmium, lithium ion and others. The term battery is meant to include all battery systems known in the state of the art. Similarly there are many different types of receivers/controllers, transmitters and receivers with video transmission capabilities that are known in the state of the art that operate on different frequencies. The activation signal is shown as Radio Frequency RF, it could also be infrared or Microwave. Also the term light source can include incandescent, quartz, LED, fluorescent and other types of light as are known in the state of the art. The control signal can come from a dedicated transmitter as shown or from cell phones, the Internet, satellite, computer, pda, mp3, mobile devices, or any other device capable of sending signals. The remote devices can be digital, analog or a combination.

Thus the scope of the invention should be determined by the appended claims and their legal equivalents, rather than by the examples given.

We claim:

1. A method for controlling a remote viewing system, comprising:
   powering a remote viewing system using battery power;
   operating the viewing system in a sleep mode;
   receiving an interrupt while the viewing system is in sleep mode;
   activating the viewing system responsive to the interrupt;
   entering a listen mode;
   waiting a period of time in the listen mode; and
   returning to the sleep mode after waiting in the listen mode.

2. The method for controlling a remote viewing system according to claim 1, wherein the interrupt is received from a sensor.

3. The method for controlling a remote viewing system according to claim 1, wherein the interrupt is received from a timer.

4. The method for controlling a remote viewing system according to claim 3, wherein the interrupt is received from the timer at a rate less than about every 1 minute.

5. The method for controlling a remote viewing system according to claim 3, wherein the interrupt is received from the low power time at a rate less than about every 10 minutes.

6. The method for controlling a remote viewing system according to claim 1, wherein the listen period is less than one second.

7. The method for controlling a wireless imager according to claim 1, further including receiving an camera activation signal during the listen period.

8. The method for controlling a wireless imager according to claim 7, further including the steps of:
   receiving an instruction from a control; and
   transmitting video signals from said camera.

9. A method for controlling a wireless camera, comprising: operating a timer while the wireless camera is in a sleep mode; receiving an interrupt from the timer; activating the wireless camera; entering a listen mode for no longer than a defined period of time; waiting for a communication signal; transmitting one or more images responsive to the communication signal; and placing the wireless camera in sleep mode after transmission is completed.

10. The method according to claim 9, wherein the interrupts are received randomly.

11. The method according to claim 9, wherein the interrupts are received at a predetermined time.

12. The method according to claim 9, wherein the interrupts are received on a periodic basis.

13. The method according to claim 9, wherein the interrupts are received according to a programmable time period.

14. A method for controlling a wireless device, comprising: operating a timer while the wireless device is in a sleep mode; receiving an interrupt from the timer; activating the wireless devices receiver; entering a listen mode for a defined duration; activating said device responsive to an activation signal; said activation signal having a duration greater than said listen mode duration; and placing the wireless device in sleep mode after devices primary function is completed.

15. The method according to claim 14, wherein wireless device is battery powered.

16. The method according to claim 15, wherein a booster increases a voltage supplied by a battery to power said wireless device.

17. The method according to claim 16, wherein the timer is provided by a processor.

18. The method according to claim 17, wherein the timer is provided by a separate circuit.

19. The method according to claim 18, wherein the listen duration is less than 1 second.

20. The method according to claim 19, wherein power is progressively consumed as necessary; ultra low power timer, low power receiver, higher power device.

* * * * *